United States Patent [19]
Paridon et al.

[11] 3,798,018
[45] Mar. 19, 1974

[54] GLASS MANUFACTURE

[75] Inventors: Leo J. Paridon, Doylestown; Cloyde G. Dye; Frank J. Yarsa, both of Barberton, all of Ohio

[73] Assignee: PPG Industries, Inc., Pittsburgh, Pa.

[22] Filed: Dec. 23, 1971

[21] Appl. No.: 211,658

[52] U.S. Cl................. 65/134, 65/136, 106/DIG. 8
[51] Int. Cl.............................................. C03b 1/00
[58] Field of Search......... 65/18, 27, 134, 135, 136, 65/178, 180; 106/74, DIG. 8, 52

[56] References Cited
UNITED STATES PATENTS
3,503,790  3/1970  Gringras..................... 106/DIG. 8
FOREIGN PATENTS OR APPLICATIONS
1,011,596  12/1965  Great Britain........................ 65/134
1,068,396  5/1967  Great Britain........................ 106/52

Primary Examiner—Robert L. Lindsay, Jr.
Attorney, Agent, or Firm—John W. Linkhauer

[57] ABSTRACT

A process for preparing glass free of voids and imperfections is provided comprising charging an aqueous slurry of glass-forming metal hydroxide, and sand to a molten glass pool at a rate sufficient to minimize spattering, segregation of reactants and carry-off of alkali with the evolved steam, maintaining the temperature of the molten glass at or above the fusion temperature of the reactants for a time sufficient to effect reaction, and recovering the resulting glass.

9 Claims, No Drawings

GLASS MANUFACTURE

This invention relates to a method of preparing a glassy metal silicate from a slurry of glass-forming metal hydroxides such as alkali metal or alkaline earth metal hydroxides, and sand as well as to a method of preparing glass from said slurry and other conventional glass-forming materials.

The raw materials from which sodium silicate, i.e., glass is made contain silica in the form of sand and one or more alkalies. These ingredients generally have the same approximate size of between about 25 and 100 mesh so as to inhibit segregation in the glass furnace and are mixed in predetermined proportions to form the batch.

The constituents of each batch have different specific gravities and when stored, or while being conveyed, have a tendency to segregate in an amount depending upon their specific gravities. Therefore, when the batch is being fed into a melting tank furnace or discharged through an opening into a container or bin and the like, the materials tend to separate. This causes the lighter portions to become separated from the silica and other portions with the result that proper melting is not obtained and the desired uniform composition of the glass is not obtained.

Moreover, glass such as metal silicate and particularly sodium silicate has been commercially prepared principally from dry materials because a minor amount of water present tends to cause spattering and a serious steaming problem. See U.S. Pat. No. 2,869,985. Alkali hydroxides, particularly caustic soda, have suffered from the further disadvantage that they are of comparatively high cost and when employed as the sole alkali there is a tendency for liquid-solid phase-separation in the caustic soda-sand mixture and, therefore, a greater tendency to variations in the composition of the finished product.

It has now been discovered, however, that if a certain amount of moisture is present in the batch and after the metal hydroxide and sand are properly intermingled they can be subjected to heat in a manner to cause a controlled evaportion of the moisture that all of the minute particles forming the batch will be united such that the resultant metal silicate is free of voids and unreacted sand particles. Further, the reaction can be conducted such that the cost is competitive with the reaction between metal carbonates and sand and that the reaction can be accomplished in less complicated and smaller equipment with less reaction time.

The amount of moisture or water present will depend upon the particular reactants and the product desired. Generally the slurry will contain water in an amount of at least about 10 percent up to about 30 percent or more but preferably the slurry contains from between about 15 and about 20 percent water by weight of the alkali and sand. All of the moisture can be present in the alkali, or both the sand and metal hydroxide or other ingredients can contain water such as, for example, the sand between about 0 and about 10 percent and the metal hydroxide between about 5 and about 50 percent by weight of water. Cullet may also contain water up to about 10 percent by weight, and other ingredients can contain a minor amount of water such as about 2 percent or less. The water is that which can be removed by heating at 752°F. (400°C.) for about 24 hours or until a constant weight is obtained.

The reactants are then preferably combined such that a fluid or free-flowing slurry (as opposed to a paste) is obtained and preferably gently applied (e.g., by the force of gravity) to a molten pool of metal silicate or glass in a manner such that spattering is minimal and segregation obviated. This can be accomplished by allowing a stream of the agitated reactants to dribble on a bed of molten metal silicate. For best results, the aqueous metal hydroxide and sand mixture is gently dribbled from an apparatus such that the charge is directed to a central area of limited diameter. For example, a vertical or angled pipe, which can contain a screw feed, having a diameter of about 2 inches is sufficient to gently introduce the stream to a very small area in the glass furnace with relation to the total surface area of the pool. Any spattering can be limited to a radius of between about 3 or 4 feet from the point of introduction and any islands or logs which are formed are easily broken down in the glass furnace without the formation of "sand caps" which occur because of irregularities in the mixing and which cause the formation of metal silicate which is unsatisfactory.

When the reactants are introduced in this gentle manner, containing the required amount of moisture, segregation is inhibited and substantially complete reaction is obtained without the formation of voids or specks. Accordingly, no mechanical means of mixing in the furnace are normally required. Although the inlet temperatures and the feed end of the furnace are normally slightly higher (up to about 300°F.), than when metal carbonates and sand are employed as the reactants, the reaction times are up to about one-third shorter such that a smaller furnace can be employed and the reactants can be directly charged to the furnace, obviating the need for a mixing system such that further cost savings can be effected.

An additional advantage from the use of the free-flowing slurry is that the glass-forming ingredients move along into and through the furnace without any mechanical means of agitation as the evaporating water is believed to provide a temperature differential in the molten glass to obtain circulation currents. It is only necessary that the molten pool have a depth sufficient to provide the temperature differential, such as from between about 1 and about 6 feet. It is not desirous to have large excesses of water, however, as this must be evaporated in the glass furnace and glass furnaces are not as efficient as conventional evaporators in removing excess water. Thus, the total amount of water should preferably be just sufficient to provide a fluid or free-flowing slurry which amount will depend upon the reactants employed, the temperature of the slurry, the temperature of the molten glass, the rate at which the slurry is charged to the molten glass, the surface area and depth of the molten glass pool, and the number of separate feed slurries employed.

The amount of water necessary to provide a free-flowing slurry can be determined by one having ordinary skill in this art. When the preferred sodium hydroxide is employed as the metal hydroxide, good results can be obtained with 72 percent sodium hydroxide and silica having up to about 10 percent water.

In addition, the slurry can be charged to the molten pool at or near the surface with other glass-forming ingredients.

Among the glass-forming metal hydroxides which can be employed are sodium hydroxide, potassium hydroxide, lead hydroxide, aluminum hydroxide, and calcium hydroxide. The preferred materials, however, are the alkali metal and alkaline earth metal hydroxides such as sodium hydroxide, potassium hydroxide, and calcium hydroxide and particularly sodium hydroxide. The sand can be of any of the commercially employed types but preferably has a particle size of less than about 30 mesh (589 microns).

The process of the invention is particularly advantageous for the preparation of metal silicate wherein the mole ratio of $SiO_2/M_2O$, wherein M is a metal, is above about 3.0. The invention can be employed, however, for metal silicates in which the $SiO_2/M_2O$ mole ratio is from between about 1 and about 4.0. Best results are obtained when the alkali is present in a substantially greater amount so that the sand is coated with the metal hydroxide and particularly favorable results are found in the formation of metal silicates such as sodium silicate having a $SiO_2/Na_2O$ ratio of 3:3.

The reactants are introduced into the molten metal silicate at or above the fusion temperature which in the case of sodium silicate and sand is preferably above about 2,300°F. A small amount of alkali of up to about 0.2 percent by weight of $M_2O$ can be carried off with the evolved steam but this can be reduced by introducing cullet, metal carbonate, or metal sulfate into the molten silicate (i.e., about 10 percent by weight of the $SiO_2$ batch weight is generally sufficient).

The slurry of metal hydroxide and sand can be quite fluid such that continuous agitation is required while feeding to the furnace because a liquid phase will separate in a few minutes upon standing.

The process of the invention can be employed to make all types of commercial glass from materials such as illustrated in *Glass Engineering Handbook*, E. B. Shand, Second Edition, 1958, page 4. Other conventional materials employed in making glass are cullet, rouge and sodium sulfate. If desired, the other glass-forming ingredients can be charged to the glass furnace with the slurry of sand and metal hydroxide either by the same conduit or separate conduits. If desired, some of the glass-forming ingredients can be formed into a frit and charged to the furnace with the slurry of sand and metal hydroxide. If desired, sodium carbonate or other metal carbonate can be substituted for the metal hydroxide at least in part although no particular advantage is obtained and preferably the glass-forming metal hydroxide constitutes from between about 70 and about 100 percent by weight of the total alkali requirements of the glass and more preferably at least about 90 percent.

The following example will serve to illustrate the invention and its preferred embodiments. All parts and percentages in said example and elsewhere in the specification and claims are by weight unless otherwise indicated.

EXAMPLE I

Wet sand containing 6 percent moisture was continuously metered into a paddle mixer at a rate of 125 pounds per minute (117.5 pounds per minute $SiO_2$, 7.5 pounds per minute water) and aqueous alkali metal hydroxide liquor containing 72 percent by weight sodium hydroxide at a temperature of 200°F. was also fed to the paddle mixer but at a rate of 65 pounds per minute (46.8 lbs./min. 72% NaOH or 36.3 lbs./min. $Na_2O$ and 18.2 lbs./min. 28% $H_2O$ or 10.5 lbs./min. $H_2O$. The mixture was agitated until it became a homogeneous slurry and then it was allowed to fall into the feed end of a glass furnace through a 10inch pipe on to a bed of molten sodium silicate having a depth of 2.5 feet and a temperature of about 2,100°F. as measured by an optical pyrometer. The temperature was raised about 300°F. in the feed end of the furnace in order to effect rapid reaction and vaporization of the "soupy" feed and cause hardening to occur. The furnace was maintained under a light positive pressure to prevent cold air from being drawn in. The resultant hardened homogeneous mix was then moved through the furnace by means of the agitation resulting from the rapid reaction and vaporization and it was noted that the mixture became homogeneous one-third faster than when sodium carbonate was employed as the alkali indicating faster melting with caustic soda. Alkali losses approximating 0.2 percent by weight of $Na_2O$ were also noted. The weight feed ratio of $SiO_2/Na_2O$ fed was 3.24 and after the 0.2 percent loss was 3.30The sodium silicate product was clear and was employed to manufacture paint, paper and rubber pigments. The pigments were found to equal or exceed sodium silicate formed from sodium carbonate as the alkali.

Although the invention has been described with reference to specific details and particular embodiments, it is not intended thereby to limit the scope of the invention except insofar as the specific details are recited in the appended claims.

We claim:

1. A process for preparing glass which comprises charging a free-flowing aqueous slurry of glass-forming reactants of metal hydroxide selected from the group consisting of sodium hydroxide, potassium hydroxide, lead hydroxide, aluminum hydroxide and calcium hydroxide and sand to a molten glass pool at a rate sufficient to minimize spattering, segregation of reactants and carry-off of metal hydroxide with evolved steam, the metal hydroxide constituting from between about 70 and 100 percent of the alkali requirements of the glass, said slurry having a water content of at least about 10 percent by weight, and maintaining the temperature of the molten glass at or above the fusion temperature of the reactants for a time sufficient to effect reaction of the reactants metal hydroxide and sand and recovering the resultant glass.

2. A process for preparing glass which comprises charging a free-flowing slurry of glass-forming reactants of metal hydroxide selected from the group consisting of sodium hydroxide, potassium, hydroxide, lead hydroxide, aluminum hydroxide and calcium hydroxide and sand to a molten glass pool at a rate sufficient to minimize spattering, segregation of reactants and carry-off of metal hydroxide with the evolved steam, the metal hydroxide constituting from between about 70 and 100 percent of the alkali requirements of the glass, said slurry having a water content of at least about 15 percent by weight, and maintaining the temperature of the molten glass at or above the fusion temperature of the reactants for a time sufficient to effect reaction of the reactants metal hydroxide and sand and recovering the resultant glass.

3. A process for preparing a metal silicate which comprises charging a free-flowing slurry of metal silicate-forming reactants of metal hydroxide selected from the group consisting of sodium hydroxide, potassium hydroxide, lead hydroxide, aluminum hydroxide and calcium hydroxide and sand to a molten metal silicate pool in a furnace, at a rate such that the metal silicate-forming ingredients move along into and through the furnace without the need for mechanical agitation means, the metal hydroxide constituting from between about 70 and 100 percent of the alkali requirements of the metal silicate, said slurry having a total water content of between about 10 and about 30 weight percent, and maintaining the temperature of the molten pool for a time such that metal silicate is withdrawn substantially free of imperfections and unreacted sand.

4. The process of claim 2 wherein the metal hydroxide is sodium hydroxide.

5. The process of claim 2 wherein the metal hydroxide is sodium hydroxide having a water content of between about 5 and about 50 percent by weight of the glass-forming ingredients.

6. The process of claim 2 wherein the metal hydroxide and sand are proportioned to provide a $SiO_2/M_2O$ mole ratio of between about 1 and about 4, wherein M is a metal.

7. The process of claim 2 wherein the temperature of the molten glass is maintained above the fusion temperature of the reactants.

8. The process of claim 2 wherein the depth of the molten glass is from between about 1 and about 6 feet.

9. The process of claim 2 wherein the metal hydroxide constitutes at least about 90 percent by weight of the total alkali requirements of the glass.

* * * * *